(12) United States Patent
Huang

(10) Patent No.: US 11,780,209 B2
(45) Date of Patent: Oct. 10, 2023

(54) WALLPAPER AND METHOD FOR MANUFACTURING SAME

(71) Applicant: EEnotech, Inc., Sunnyvale, CA (US)

(72) Inventor: Sidi Huang, San Jose, CA (US)

(73) Assignee: EENOTECH, INC., Sunnyvale, CA (US)

( * ) Notice: Subject to any disclaimer, the term of this patent is extended or adjusted under 35 U.S.C. 154(b) by 0 days.

(21) Appl. No.: 17/534,887

(22) Filed: Nov. 24, 2021

(65) Prior Publication Data

US 2023/0158776 A1    May 25, 2023

(51) Int. Cl.
*B32B 27/32* (2006.01)
*B32B 15/085* (2006.01)
*B32B 37/12* (2006.01)
*B32B 37/24* (2006.01)

(52) U.S. Cl.
CPC ............ *B32B 15/085* (2013.01); *B32B 27/32* (2013.01); *B32B 37/12* (2013.01); *B32B 37/24* (2013.01); *B32B 2307/304* (2013.01); *B32B 2607/02* (2013.01)

(58) Field of Classification Search
CPC ....... B32B 15/085; B32B 27/32; B32B 37/12; B32B 37/24; B32B 2307/304; B32B 2607/02
See application file for complete search history.

(56) References Cited

U.S. PATENT DOCUMENTS

| 4,340,634 A | | 7/1982 | Pusch et al. |
| 5,643,668 A | * | 7/1997 | Calhoun ............... C09J 7/29 428/354 |
| 2019/0152410 A1 | | 5/2019 | Zhu et al. |

FOREIGN PATENT DOCUMENTS

| DE | 3630243 A1 | 3/1988 |
| DE | 4337014 A1 | 2/1995 |
| EP | 3744517 A1 | 12/2020 |
| JP | H 02-295733 | 12/1990 |
| JP | 2006-097212 | 4/2006 |
| JP | 2010-222777 | 10/2010 |
| JP | 2017-136788 | 8/2017 |
| JP | 2020-163807 | 10/2020 |
| WO | WO 2012/096304 | 7/2012 |
| WO | WO 2015/147182 | 10/2015 |
| WO | 2021124121 A1 | 6/2021 |

* cited by examiner

*Primary Examiner* — Lawrence D Ferguson

(57) ABSTRACT

A wallpaper includes a support portion having a flat surface, and a functional layer disposed on the flat surface of the support portion. The functional layer includes a metallic film and has an emissivity of greater than zero and equal to or less than 0.6. The wallpaper further includes a particulate layer disposed on the functional layer and including a polymer body and inorganic particles dispersed in the polymer body.

20 Claims, 7 Drawing Sheets

WALLPAPER AND METHOD FOR MANUFACTURING SAME

TECHNICAL FIELD

This disclosure is generally related to wallpapers for buildings and methods for manufacturing the wallpapers, and more specifically to energy efficient wallpapers for buildings and methods for manufacturing the energy efficient wallpapers.

BACKGROUND

Wallpapers can be applied to the exterior and/or interior of a building for various purposes, such as cooling, heating, protection, decoration, waterproofing, noise reduction, etc. Most of the decorative wallcoverings focus on decorative purpose in the commercial environments such as hotels, hospitals, apartment buildings, retail outlets, and schools. Some materials in use for this type of wallcoverings are vinyl, mica, grass-cloth, linen, paper-weave, silk, and wood veneer. Some specialized wallcoverings offer sound reduction. Examples where these specialized wallcoverings are applied include meeting rooms, offices, auditoriums, restaurants, as well as corridors and elevator lobbies. Materials for sound reduction include polyolefin and olefin fibers, and cork/cork veneer.

No existing wallcovering is designed to reduce energy cost and consumption of the building. For example, in general 13% of total energy is consumed by heating and cooling of the building envelopes. It is desirable to develop a wallpaper for buildings that can reduce the energy consumption.

SUMMARY

Described herein are wallpapers that can be applied to exterior and/or interior of a building to reduce energy consumption of the building structures.

In one aspect, a wallpaper includes a support portion having a flat surface, and a functional layer disposed on the support portion. The functional layer includes a metallic film and has an emissivity of greater than zero and equal to or less than 0.6. The wallpaper further includes a particulate layer disposed on the functional layer. The particulate layer includes a polymer body and inorganic particles dispersed in the polymer body.

In some embodiments, the support portion includes one of fabric-backed vinyl, paper-backed vinyl, non-woven fabric, polyester, wood, metal, stucco, clad, brick, masonry, stone, steel, cement, or concrete.

In some embodiments, the wallpaper further includes a first adhesive layer disposed between the support portion and the functional layer.

In some embodiments, the functional layer further includes a polymer layer in contact with the first adhesive layer. In some embodiments, the polymer layer includes polyethylene terephthalate. In some embodiments, the polymer layer includes polyethylene, polypropylene, polylactide, poly(glycolic acid), or polybutylene succinate.

In some embodiments, the metallic film includes one of aluminum, silver, titanium, polished copper, brass, tin, gold, or a combination of the foregoing metals.

In some embodiments, the wallpaper further includes a second adhesive layer disposed between the functional layer and the particulate layer. The polymer of the second adhesive layer and the polymer body include polyethylene.

In some embodiments, a thickness of the second adhesive layer is less than a thickness of the particulate layer.

In some embodiments, the inorganic particles includes one or more of ZnO, $TiO_2$, iron oxide, $Fe_2O_3$, Prussian blue, or silicon.

In some embodiments, the particulate layer further comprises a UV stabilizer.

In some embodiments, the inorganic particles include nanoparticles or submicron particles.

In some embodiments, the wallpaper further includes a decorative layer and/or a protective layer disposed on the particulate layer.

In another aspect, a method for forming a wallpaper is provided. The method includes: mixing inorganic particles with a polymer material to form a composite material, the polymer material including a polymer; extruding the composite material to form a particulate layer; laminating a polymer layer on a first surface of a metallic film to form a functional layer; thermally laminating the particulate layer with the functional layer such that the particulate layer is bonded with the functional layer; and adhering a support portion to the functional layer to form the wallpaper.

In some embodiments, before extruding the composite material to form the particulate layer, the method further includes: infusing the composite material with an additional material comprising the first polymer.

In some embodiments, the method further includes forming a decorative layer on the particulate layer. In some embodiments, the decorative layer is formed by a printing technique, such as flexographic printing, block printing, flatbed screen printing, gravure printing, rotary screen printing, digital printing, etc.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

Figure 1:
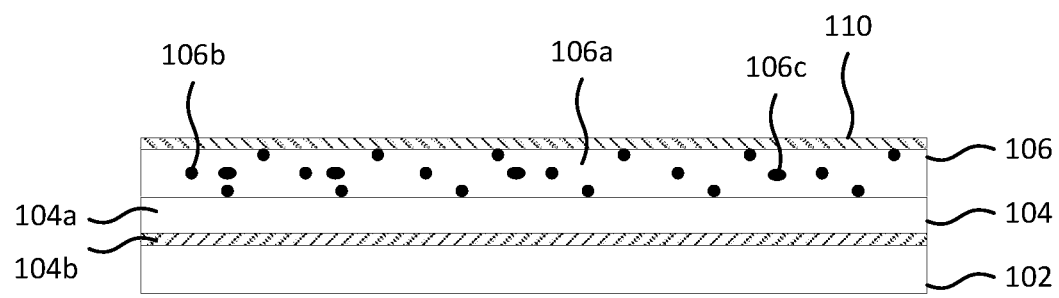
FIG. 1 is a diagram illustrating a wallpaper according to one example embodiment.

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to wallpapers that can be applied to exterior and/or interior of a building to reduce energy consumption of the building structures. In one embodiment, a wallpaper includes a support portion having a flat surface, and a functional layer disposed on the flat surface of the support portion. The functional layer includes a metallic film and has an emissivity of greater than zero and equal to or less than 0.6. The wallpaper further includes a particulate layer disposed on the functional layer. The particulate layer includes a polymer body and inorganic particles dispersed in the polymer body.

In another embodiment, a wallpaper includes a support portion having a flat surface, a first adhesive layer disposed on the flat surface of the support portion, and a functional layer disposed on the first adhesive layer. The functional layer includes a metallic film. The wallpaper further includes a second adhesive layer disposed on the functional layer, where the second adhesive layer includes a polymer. The wallpaper further includes a particulate layer disposed on the second adhesive layer. The particulate layer includes a polymer body and inorganic particles dispersed in the polymer body. The polymer body includes the same polymer as that of the second adhesive layer. The disclosed wallpapers, when installed inside a building, can reflect heat back into the interior of the building during the winter to reduce energy absorbed by the walls of the building. Moreover, the disclosed wallpaper, when installed outside a building, can reflect sunlight illuminated on the building to reduce heat absorbed by the walls of the building, thus lowering the cost used to cool down the building.

Embodiments will now be explained with accompanying figures. Reference is first made to FIG. 1. FIG. 1 is a diagram illustrating a wallpaper 100 according to one example embodiment. The wallpaper 100 includes a support portion 102, a functional layer 104, and a particulate layer 106. The support portion 102 is configured to provide support for other layers of the wallpaper 100. The support portion 102 is also used to maintain the overall structure integrity of the wallpaper 100 and provides the mechanical strength for the wallpaper 100. In some embodiments, the support portion 102 may include one of fabric-backed vinyl, paper-backed vinyl, non-woven fabric, polyester, wood, metal, stucco, clad, brick, masonry, stone, steel, cement, concrete, or any other suitable material that can be applied to a building and provide support for the layer structures of the wallpaper 100. In some embodiments, the support portion is a layer having a thickness of about 100 µm, 200 µm, 300 µm, 400 µm, 500 µm, 600 µm, 700 µm, 800 µm, 900 µm, 1 mm, or between any two of the above numbers, or more than 1 mm. In some embodiments, the support portion/layer 102 includes at least a flat surface that is compatible with the functional layer 104. In the illustrate embodiment of FIG. 1, the support portion/layer 102 has an upper flat surface in contact with the functional layer 104.

The functional layer 104 includes a metallic film 104*a*. The metallic film 104*a* is configured to reflect heat to reduce the radiative heat penetrating into a structure to which the wallpaper is attached. The metallic film 104*a* includes a metallic material that has a low emissivity. For example, the metallic film 104*a* may include one of aluminum, silver, titanium, polished copper, brass, tin, gold, or a combination of the foregoing metals. The metallic film 104*a* is designed to be thin to reduce material cost. For example, a thickness of the metallic film 104*a* may be less than 10 µm, less than 5 µm, less than 3 µm, less than 1 µm, or between any two of the above numbers.

In some embodiments, the functional layer 104 may be provided with a polymer layer 104*b* to facilitate adhesion with the support portion 102. In the illustrated embodiment, the polymer layer 104*b* is disposed between the metallic layer 104*a* and the support portion 102. For example, the polymer layer 104*b* may include polyethylene terephthalate (PET). In some embodiments, the polymer layer 104*b* may include polyethylene (PE) polypropylene (PP), polylactide (PLA), poly(glycolic acid) (PGA), polybutylene succinate (PBS), or other biodegradable plastics. In some embodiments, the polymer layer 104*b* may include flame-resisted PP, PE, PET, PLA, PGA, or PBS. This disclosure, however, is not limited to these examples. Other polymer materials that can provide a flame-resist function and/or improve adhesion between the support portion 102 and the metallic film 104*a* are contemplated for the polymer layer 104*b*. In some embodiments, the polymer layer 104*b* may be formed on the metallic film 104*a* by spraying or printing a layer of suitable polymer onto the metallic layer 104*a*. In some embodiments, the polymer layer 104*b* may be a pre-prepared thin film and is laminated onto the metallic film 104*a*. A thickness of the polymer layer 104*b* is designed to promote strong bonding between the support portion 102 and the metallic film 104*a* to form a durable wallpaper. For this purpose, the thickness of the polymer layer 104*b* may not be less than 500 nm, not less than 1 µm, not less than 2 µm, not less than 3 µm, or not less than 4 µm. On the other hand, the thickness of the polymer layer 104b may be designed to save the cost for the polymer layer 104b. For example, an optimized thickness of the polymer layer 104b is about 5 μm, 7.5 μm, 10 μm, 12.5 μm, 15 μm, 20 μm, 25 μm, 30 μm, 40 μm, or between any two of the above numbers. In some embodiments, the polymer layer 104b may be omitted from the functional layer 104. In this embodiment, the metallic film 104a is in contact with the support portion 102.

The particulate layer 106 includes a polymer body 106a and inorganic particles 106b dispersed in the polymer body 106a. The inorganic particles 106b can provide visual effects to the appearance of the wallpaper. For example, the inorganic particles 106b allow a user to see color and/or texture of the wallpaper 100. The inorganic particles 106b may be reflective and transparent at visible and near-mid infrared regions, respectively. In some embodiments, the inorganic particles 106b may include one or more of ZnO, $TiO_2$, iron oxide, $Fe_2O_3$, Prussian blue, or silicon, or other particles that can provide color and visual effects to human eyes. In some embodiments, the inorganic particles 106b are uniformly dispersed in the polymer body 106a. In some embodiments, to create a textured visual outlook, the inorganic particles 106b may be dispersed at a first portion of the polymer body 106a at a density different from that at a second portion of the polymer body 106a.

A shape of the inorganic particles 106b may be varied to obtain desired visual effects. For example, the inorganic particles 106b may be round, needle-like, rugby-shaped, or in other shapes. A size of the inorganic particles 106b is designed to provide desired visual effects. To be effective for their purpose, an average size of the inorganic particles 106b may be, for example, about 20 nm, 40 nm, 60 nm, 80 nm, 100 nm, 150 nm, 200 nm, 250 nm, 300 nm, 350 nm, 400, nm, 450 nm, 500 nm, 550 nm, 600 nm, 650 nm, 700 nm, 750 nm, 800 nm, 850 nm, 900 nm, 950 nm, 1000 nm, 1100 nm, 1200 nm, 1300 nm, 1400 nm, 1500 nm, 1600 nm, 1700 nm, 1800 nm, 1900 nm, 2000 nm, or between any two of the above numbers.

The polymer body 106a of the particulate layer 106 provides support for the inorganic particles 106b. The material and the thickness of the polymer body 106a are selected to reduce emissivity of the wallpaper 100. The low emissivity of the particulate layer 106 allows low absorption of radiation energy such that the radiation energy can be reflected by the functional layer 104. In some embodiments, the polymer body 106a includes polyethylene (PE) that may include linear low-density polyethylene (LLDPE), low-density polyethylene (LDPE), or high-density polyethylene (HDPE). In some embodiments, a thickness of the polymer body 106a is about 10 μm, 15, μm, 20 μm, 25 μm, 30 μm, 35 μm, 40 μm, 45 μm, 50 μm, 55 μm, 60 μm, 70 μm, 80 μm, 90 μm, 100 μm, or between any two of the above numbers. The conventional low emissivity building films commonly show solitary metalized silver color, suffering from severe aesthetical limitations, which tremendously hinder their extensive practical applications. The particulate layer 106 of the disclosed wallpapers includes inorganic particles 106b that can provide the wallpapers with various colors and appearance.

The surface of the particulate layer 106 may look glossy, semi-glossy, or non-glossy to provide choices to users. To reduce glossiness, the inorganic particles 106b may be sized to nanoscales, or matt PE materials may be used for the polymer body 106a, or the surface of the particulate layer 106 may be patterned.

In some embodiments, the particulate layer 106 further includes a light stabilizer 106c to reduce polymer decay over long-term sun exposure. For example, the light stabilizer 106c may be a UV light stabilizer (e.g., UV 783). In some embodiments, the light stabilizer 106c may be a hindered amine light stabilizers (HALS).

In some embodiments, the particulate layer 106 includes 5-20 wt % of the inorganic particles 106b, 0.5-1 wt % of the light stabilizer 106c, balanced with the polymer body 106a.

In some embodiments, the particulate layer 106 may further include environmental friendly flame retardants against potential fire in actual usage cases. For example, the environmental friendly flame retardants may be part of the inorganic particles 106b. In some embodiments, the environmental friendly flame retardants may include one or more of $Mg(OH)_2$ or $Al(OH)_3$.

In some embodiments, the wallpaper 100 may alternatively or additionally include a protective layer 110 coated on the particulate layer 106. The protective layer 110 may be a low-emissivity ultraviolet (UV) coating that can protect the underlying layers. The UV coating can be formed by spraying a UV-curable material on the topmost layer of the wallpaper and curing the UV-curable material with UV radiation. The protective layer 110 may include a durable material that is abrasion resistance and can protect the wallpaper 100 against scratches, tears, and fingerprints. The protective layer 110 may be thin to remain low emissivity. For example, a thickness of the protective layer 110 may be 1-10 μm.

In some embodiments, the wallpaper 100 has a low emissivity of greater than zero but lower than 0.2, 0.25, 0.3, 0.35, 0.4, 0.45, 0.5, 0.55 or 0.6, or between any two of the above numbers. Emissivity is defined as the ratio of the energy radiated from a material's surface to that radiated from a perfect emitter. In some embodiments, to provide the wallpaper 100 with a low emissivity, a thickness of the particulate layer 106 is about 10 μm, 20 μm, 30 μm, 40 μm, 50 μm, 60 μm, 70 μm, 80 μm, 90 μm, 100 μm, or between any two of the above numbers.

Figure 2:
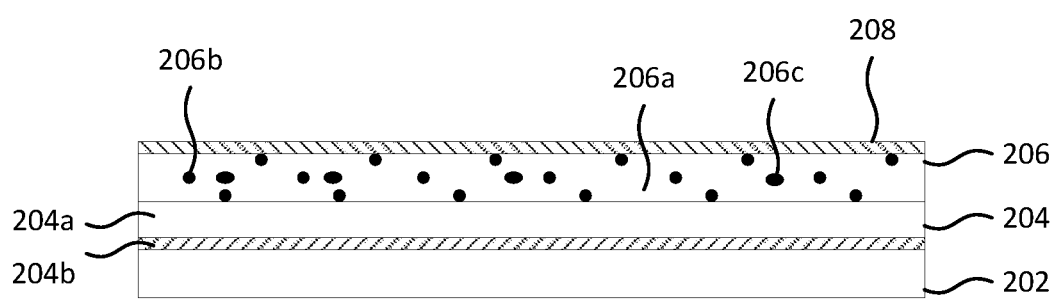
FIG. 2 is a diagram illustrating another wallpaper according to one example embodiment.

Reference is now made to FIG. 2. FIG. 2 is a diagram illustrating a wallpaper 200 according to one example embodiment. The wallpaper 200 includes a support portion 202, a functional layer 204, a particulate layer 206, and a decorative layer 208. The support portion 202, the functional layer 204, and the particulate layer 206 are similar to the support portion 102, the functional layer 104, and the particulate layer 106 of FIG. 1, and their descriptions can be referred to those in connection with FIG. 1 and will be omitted.

The decorative layer 208 may provide color and aesthetic looking for the wallpaper 200. In some embodiments, the decorative layer 208 may include inks of various colors and textures. The decorative layer 208 may provide patterns or graphics on the particulate layer 206. The decorative layer 208 may be a pattern/graphic layer. In some embodiments, the decorative layer 208 may have a rough surface facing outward. The decorative layer 208 is designed to have a low emissivity to reduce absorption of the radiative heat. For this purpose, the decorative layer 208 has a thickness of less than 5 μm, 4 μm, 3 μm, 2 μm, or 1 μm, or between any two of the above numbers. The decorative layer 208 may be formed by a printing technique, such as flexographic printing, block printing, flatbed screen printing, gravure printing, rotary screen printing, digital printing, etc.

Figure 3:
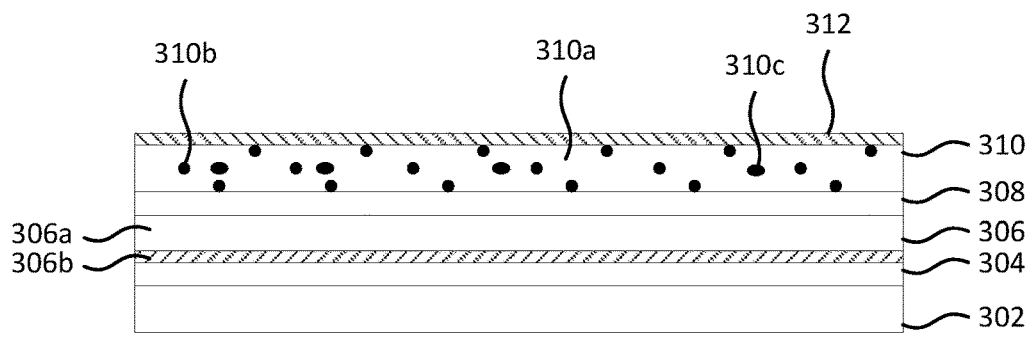
FIG. 3 is a diagram illustrating yet another wallpaper according to one example embodiment.

FIG. 3 is a diagram illustrating a wallpaper 300 according to one example embodiment. The wallpaper 300 includes a support portion 302, a first adhesive layer 304, a functional layer 306, a second adhesive layer 308, and a particulate layer 310. The support portion 302 is configured to provide support for other layers of the wallpaper 300. The support portion 302 is also used to maintain the overall structure integrity of the wallpaper 300 and provides the mechanical strength for the wallpaper 300. In some embodiments, the support portion 302 may include one of fabric-backed vinyl, paper-backed vinyl, non-woven fabric, polyester, wood, metal, stucco, clad, brick, masonry, stone, steel, cement, concrete, or any other suitable material that can be applied to a building and provide support for layer structures of the wallpaper 300. In some embodiments, the support portion is a layer having a thickness of about 100 µm, 200 µm, 300 µm, 400 µm, 500 µm, 600 µm, 700 µm, 800 µm, 900 µm, 1 mm, or between any number of the above, or more than 1 mm. In some embodiments, the support portion/layer 302 includes at least a flat surface that is compatible with the first adhesive layer 304. In the illustrate embodiment of FIG. 3, the support portion/layer 302 has an upper flat surface in contact with the first adhesive layer 304.

The functional layer 306 includes a metallic film 306a. In some embodiments, functional layer 306 may optionally include a polymer layer 306b. The metallic film 306a is configured to reflect heat to reduce the radiative heat penetrating into a structure to which the wallpaper is attached. The metallic film 306a include a metallic material that has a low emissivity. For example, the metallic film 306a may include one of aluminum, silver, titanium, polished copper, brass, tin, gold, or a combination of the foregoing metals. The metallic film 306a is designed to be thin to reduce material cost. For example, a thickness of the metallic film 306a may be less than 10 µm, less than 5 µm, less than 3 µm, less than 1 µm, or between any two of the above numbers.

In some embodiments, the functional layer 306 is provided with a polymer layer 306b to facilitate adhesion with the first adhesive layer 304. In the illustrated embodiment, the polymer layer 306b is disposed between the metallic layer 306a and the first adhesive layer 304. For example, the polymer layer 306b may include PP, PE, PET, PLA, PGA, or PBS. In some embodiments, the polymer layer 306b may include flame-resisted PP, PE, PET, PLA, PGA, or PBS. This disclosure, however, is not limited to these examples. Other polymer materials that can provide a flame-resist function and/or improve adhesion between the first adhesive layer 304 and the metallic film 306a are contemplated for the polymer layer 306b. In some embodiments, the polymer layer 306b may be formed on the metallic film 306a by spraying or printing a layer of suitable polymer onto the metallic layer 306a. In some embodiments, the polymer layer 306b may be a pre-prepared thin film and is laminated onto the metallic film 306a. A thickness of the polymer layer 306b is designed to promote strong bonding between the support portion 302 and the metallic film 306a to form a durable wallpaper. For this purpose, the thickness of the polymer layer 306b may not be less than 500 nm, not less than 1 µm, not less than 2 µm, not less than 3 µm, or not less than 4 µm. On the other hand, the thickness of the polymer layer 306b may be designed to save the cost for the polymer layer 306b. For example, an optimized thickness of the polymer layer 306b is about 5 µm, 7.5 µm, 10 µm, 12.5 µm, 15 µm, 20 µm, 25 µm, 30 µm, 40 µm, or between any two of the above numbers.

The first adhesive layer 304 is configured to bond the support portion 302 and the functional layer 306. In some embodiments, the first adhesive layer 304 may be a glue. For example, the first adhesive layer 304 may include a water-based or an oil-based glue, or polymer glue, or other glues that can provide sufficient bonding strength between the support portion 302 and the functional layer 306. In some embodiments, before applying the first adhesive layer 304 to the support portion 302, a surface of the support portion 302 to receive the first adhesive layer 304 may be surface-treated to increase the bonding strength. For example, the surface of the support portion 302 may be plasma treated.

The particulate layer 310 include a polymer body 310a and inorganic particles 310b dispersed in the polymer body 310a. The inorganic particles 310b can provide visual effects to the appearance of the wallpaper. For example, the inorganic particles 310b allow a user to see color and/or texture of the wallpaper 300. The inorganic particles may be reflective and transparent at visible and near-mid infrared regions, respectively. In some embodiments, the inorganic particles 310b may include one or more of ZnO, $TiO_2$, iron oxide, $Fe_2O_3$, Prussian blue, or silicon, or other particles that can provide color and visual effects to human eyes. In some embodiments, the inorganic particles 310b are uniformly dispersed in the polymer body 310a. In some embodiments, to create a textured visual outlook, the inorganic particles 310b may be dispersed at a first portion of the polymer body 310a at a density different from that at a second portion of the polymer body 310a.

A shape of the inorganic particles 310b may be varied to obtain desired visual effects. For example, the inorganic particles 310b may be round, needle-like, rugby-shaped, or in other shapes. A size of the inorganic particles 310b is designed to provide desired visual effects. For example, an average size of the inorganic particles 310b may be about 20 nm, 40 nm, 60 nm, 80 nm, 100 nm, 150 nm, 200 nm, 250 nm, 300 nm, 350 nm, 400, nm, 450 nm, 500 nm, 550 nm, 600 nm, 650 nm, 700 nm, 750 nm, 800 nm, 850 nm, 900 nm, 950 nm, 1000 nm, 1100 nm, 1200 nm, 1300 nm, 1400 nm, 1500 nm, 1600 nm, 1700 nm, 1800 nm, 1900 nm, 2000 nm, or between any two of the above numbers.

The polymer body 310a of the particulate layer 310 provides support for the inorganic particles 310b. The material and the thickness of the polymer body 310a are selected to reduce emissivity of the wallpaper 300. In some embodiments, the polymer body 310a includes PE materials, e.g., LLDPE, LDPE, or HDPE. In some embodiments, a thickness of the polymer body 310a is about 10 µm, 15, µm, 20 µm, 25 µm, 30 µm, 35 µm, 40 µm, 45 µm, 50 µm, 55 µm, 60 µm, or between any two of the above numbers.

The surface of the particulate layer 310 may look glossy, semi-glossy, or non-glossy to provide choices to users. To reduce glossiness, the inorganic particles 310b may be sized to nanoscales, or matt PE materials may be used for the polymer body 310a, or the surface of the particulate layer 310 may be patterned.

In some embodiments, the particulate layer 310 further includes a light stabilizer 310c to reduce polymer decay over long-term sun exposure. For example, the light stabilizer 310c may be a UV light stabilizer (e.g., UV 783). In some embodiments, the light stabilizer 310c may be a hindered amine light stabilizers (HALS).

In some embodiments, the particulate layer 310 includes 5-20 wt % of the inorganic particles 310b, 0.5-1 wt % of the light stabilizer 310c, balanced with the polymer body 310a.

In some embodiments, the particulate layer 106 may further include environmental friendly flame retardants.

The second adhesive layer 308 is configured to bond the functional layer 306 and the particulate layer 310. Because the second adhesive layer 308 is disposed on the functional layer 306 and may increase the emissivity of the wallpaper 300, the material and thickness of the second adhesive layer 308 are selected to reduce its impact on emissivity. In some embodiments, the second adhesive layer 308 may include a material that is the same as or similar to that employed in the polymer body 310a of the particulate layer 310 to increase the bonding strength and reduce its impact on increased emissivity. For example, the second adhesive layer 308 may include or consist of one of PE materials, e.g., LLDPE, LDPE, or HDPE. The thickness of the second adhesive layer 308 is selected to be less than that of the particulate layer 310 reduce its impact on emissivity. For example, a thickness of the second adhesive layer 308 may be about 3 μm, 5 μm, 6 μm, 8 μm, or 10 μm, or between any two of the above numbers, to reduce emissivity.

In some embodiments, the wallpaper 300 has a low emissivity of greater than zero but lower than 0.2, 0.25, 0.3, 0.35, 0.4, 0.45, 0.5, 0.55, 0.6, or between any two of the above numbers. In some embodiments, to provide the wallpaper 300 with a low emissivity, a total thickness of the particulate layer 310 and the second adhesive layer 308 is about 10 μm, 20 μm, 30 μm, 40 μm, 50 μm, 60 μm, 70 μm, 80 μm, 90 μm, 100 μm, or between any two of the above numbers.

In some embodiments, the wallpaper 300 may further include a decorative layer 312 disposed on the particulate layer 310. The decorative layer 312 may provide color and aesthetic looking for the wallpaper 300. In some embodiments, the decorative layer 312 may include inks of various colors and textures. The decorative layer 312 may provide patterns or graphics on the particulate layer 310. The decorative layer 312 may be a pattern/graphic layer. The decorative layer 312 is designed to have a low emissivity to reduce the radiative heat penetration. For this purpose, the decorative layer 312 has a thickness of less than 5 μm, 4 μm, 3 μm, 2 μm, or 1 μm, or between any two of the above numbers. The decorative layer 312 may be formed by a printing technique, such as flexographic printing, block printing, flatbed screen printing, gravure printing, rotary screen printing, digital printing, etc.

It is to be understood that the various layers as shown in FIGS. 1-3 may be selected for a wallpaper. For example, the protective layer 110 of wallpaper 100 may be applied to wallpapers 200 and 300.

Figure 4:
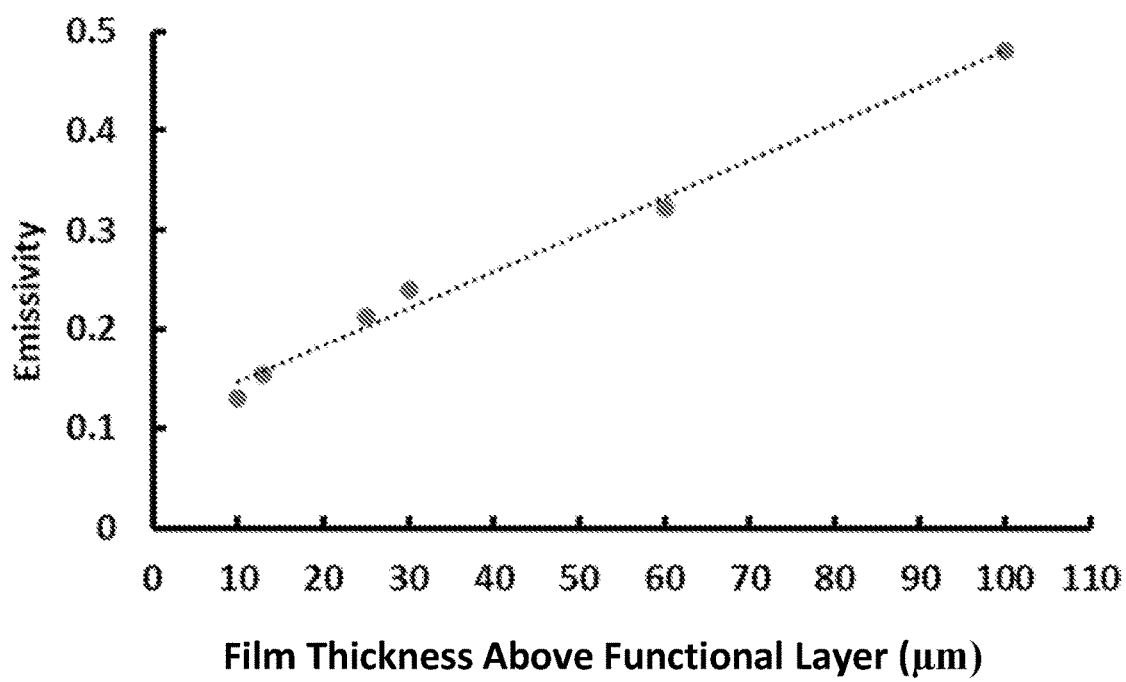
FIG. 4 is a diagram depicting how a thickness of a polymer film above a functional layer affects emissivity of a wallpaper, according to one example embodiment.

FIG. 4 is a diagram depicting how a thickness of a polymer film above a functional layer affects emissivity of a wallpaper, according to one example embodiment. In the illustrated embodiment, the functional layer includes an Al metallic film while the polymer film on the metallic film is PE. As shown in FIG. 4, the emissivity of the polymer film is increased with increased thickness of the polymer film. To be effective to reflect heat, the thickness of the polymer film of the disclosed wallpaper is selected to be equal to or less than 100 μm.

Figure 5:
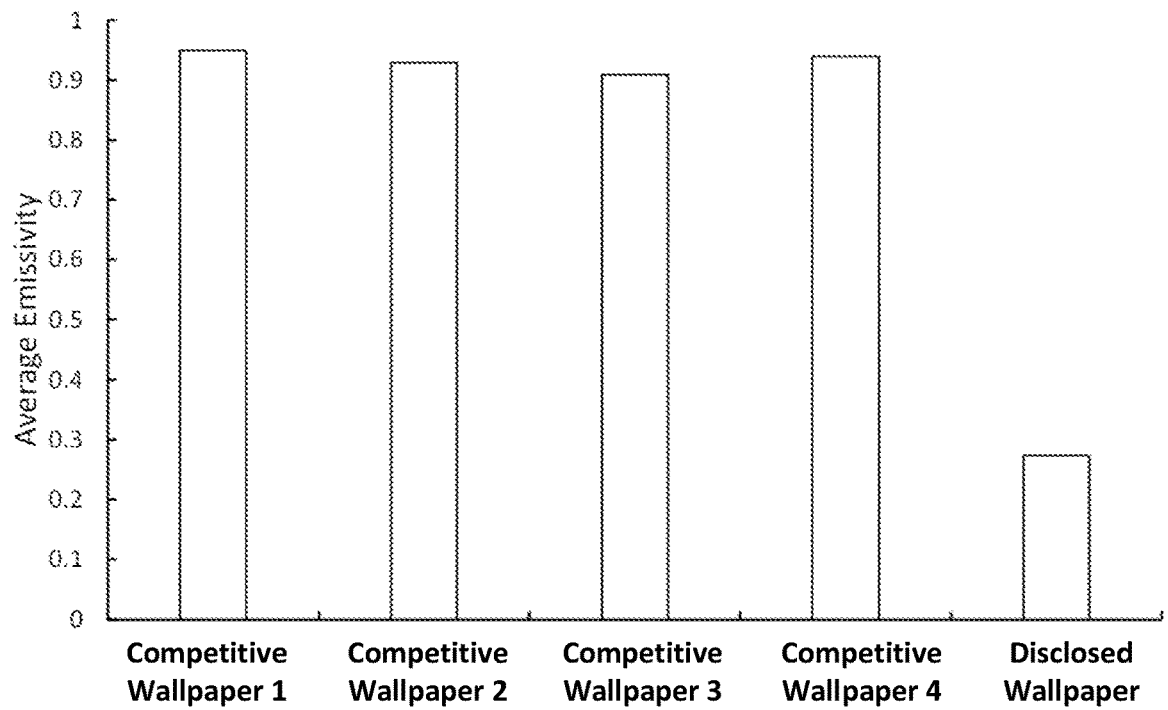
FIG. 5 is a diagram illustrating emissivities of the disclosed wallpaper and various competitive wallpapers.

FIG. 5 is a diagram illustrating emissivity of the disclosed wallpaper and various competitive wallpapers. As shown in FIG. 5, all competitive wallpapers have an emissivity of about 0.9, while the disclosed wallpaper has a much smaller emissivity below 0.3. More thermal radiation will be reflected when the emissivity of a wallpaper is lower. This demonstrates that the disclosed wallpaper has a better reflection than the competitive wallpapers in the current market. When applied to an outer surface of a building, the disclosed wallpaper can better reflect sunlight back to the external environment and reduce heat absorption by the building. Moreover, when applied to an interior surface of a building, the disclosed wallpaper can better reflect heat generated by a heating system during the winter back into the rooms, thereby saving energy consumed by the heating system.

Figure 6A:
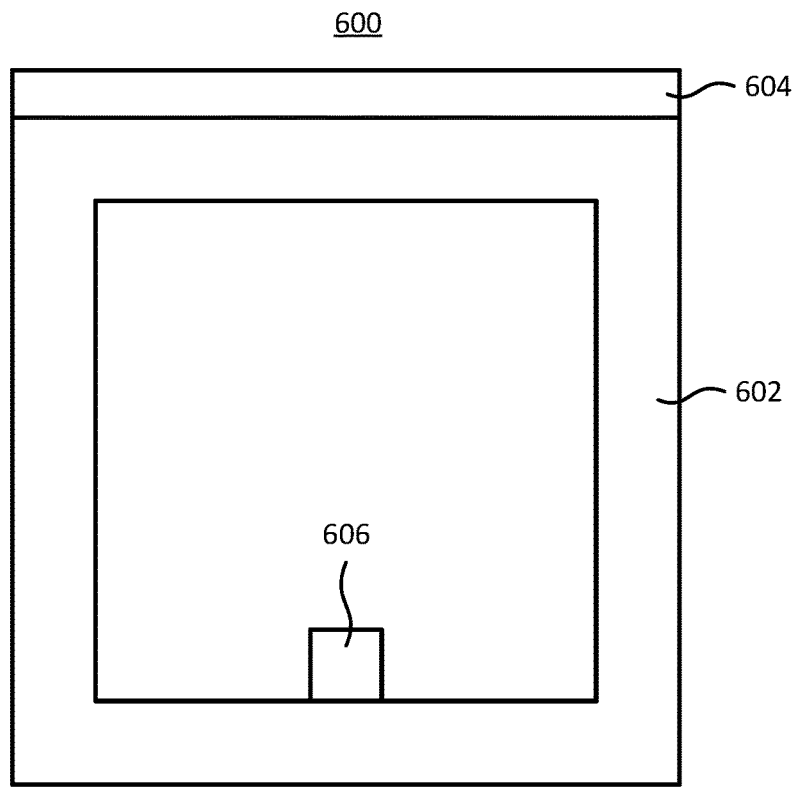
FIG. 6A is a schematic diagram depicting a testing environment for testing performance of various wallpapers, according to one example embodiment.

FIG. 6A is a schematic diagram depicting a testing environment 600 for testing performances of various wallpapers, according to one example embodiment. The testing environment 600 includes a space enclosed by a wall 602. The wall 602 is insulted with a polystyrene foam. A wallpaper 604 for testing is attached to one surface of the wall 602. A temperature sensor 606 is attached to an internal surface of the wall 602 away from where the wallpaper 604 is attached to. During the testing, a heating lamp is turned on in front of the wallpaper 604 while the temperature at the space is measured by the temperature sensor 606. In the testing environment, the temperature at the space can be continuously monitored. The temperature in the space is expected to increase while the heating lamp is turned on.

Figure 6B:
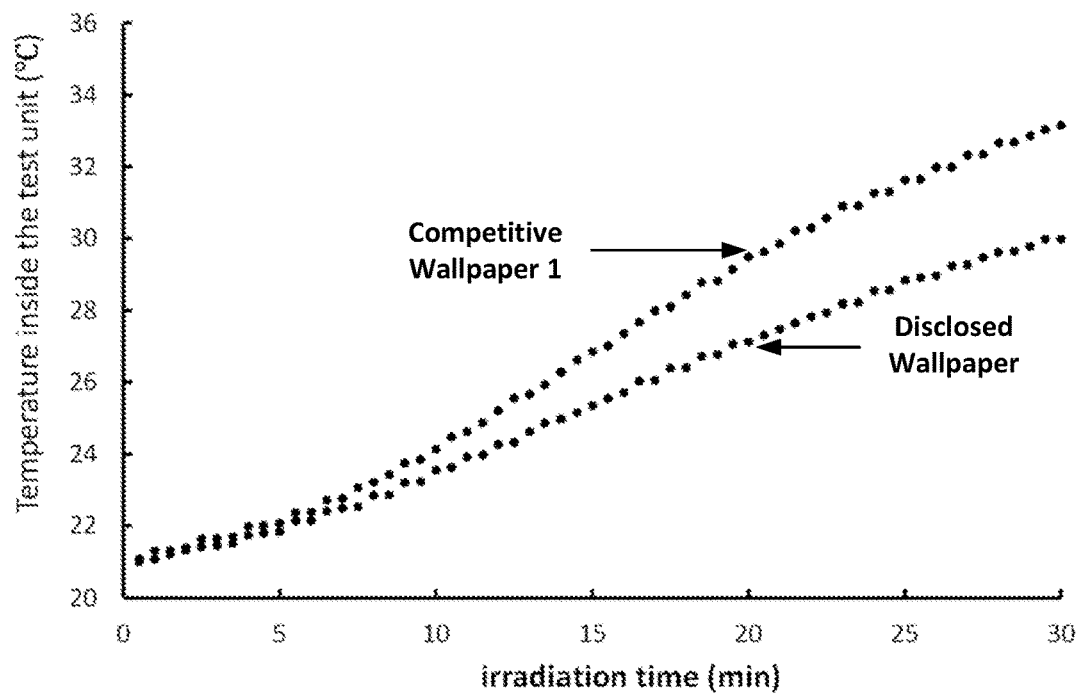
FIG. 6B is a diagram illustrating testing results employing the testing environment as shown in FIG. 6A.

FIG. 6B is a diagram illustrating testing results employing the testing environment 600 as shown in FIG. 6A. As shown in FIG. 6B, the temperature increases at a higher rate for the competitive wallpaper than for the disclosed wallpaper, indicating a better heat reflection for the disclosed wallpaper. After heating by the heating lamp for 30 minutes, the temperature within the space is 3.3° C. higher when the competitive wallpaper is applied to the wall 602 than when the disclosed wallpaper is applied to the wall 602.

Figure 7:
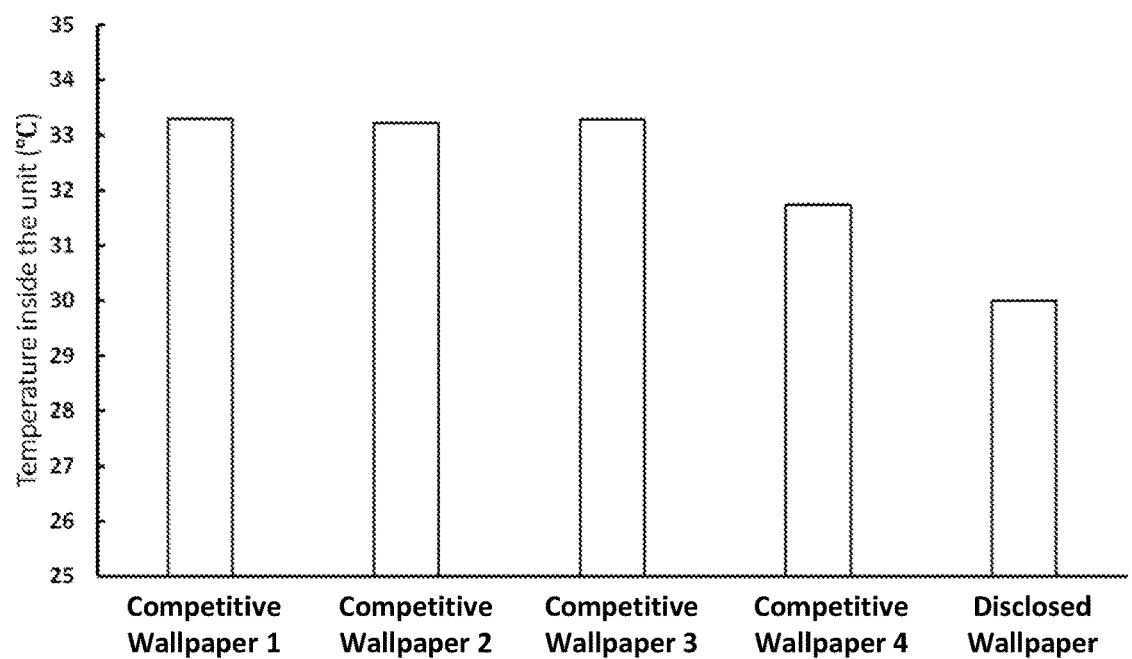
FIG. 7 is a diagram showing a summary of testing results employing the testing environment as shown in FIG. 6A.

FIG. 7 is a diagram showing a summary of testing results employing the testing environment 600 as shown in FIG. 6A. The summary indicates that with the disclosed wallpaper, the temperature at the space is on average 3° C. cooler than the competitive commercial products. This testing confirms that the disclosed wallpaper makes the room cooler, reducing the cooling energy for a comfort living space.

Figure 8:
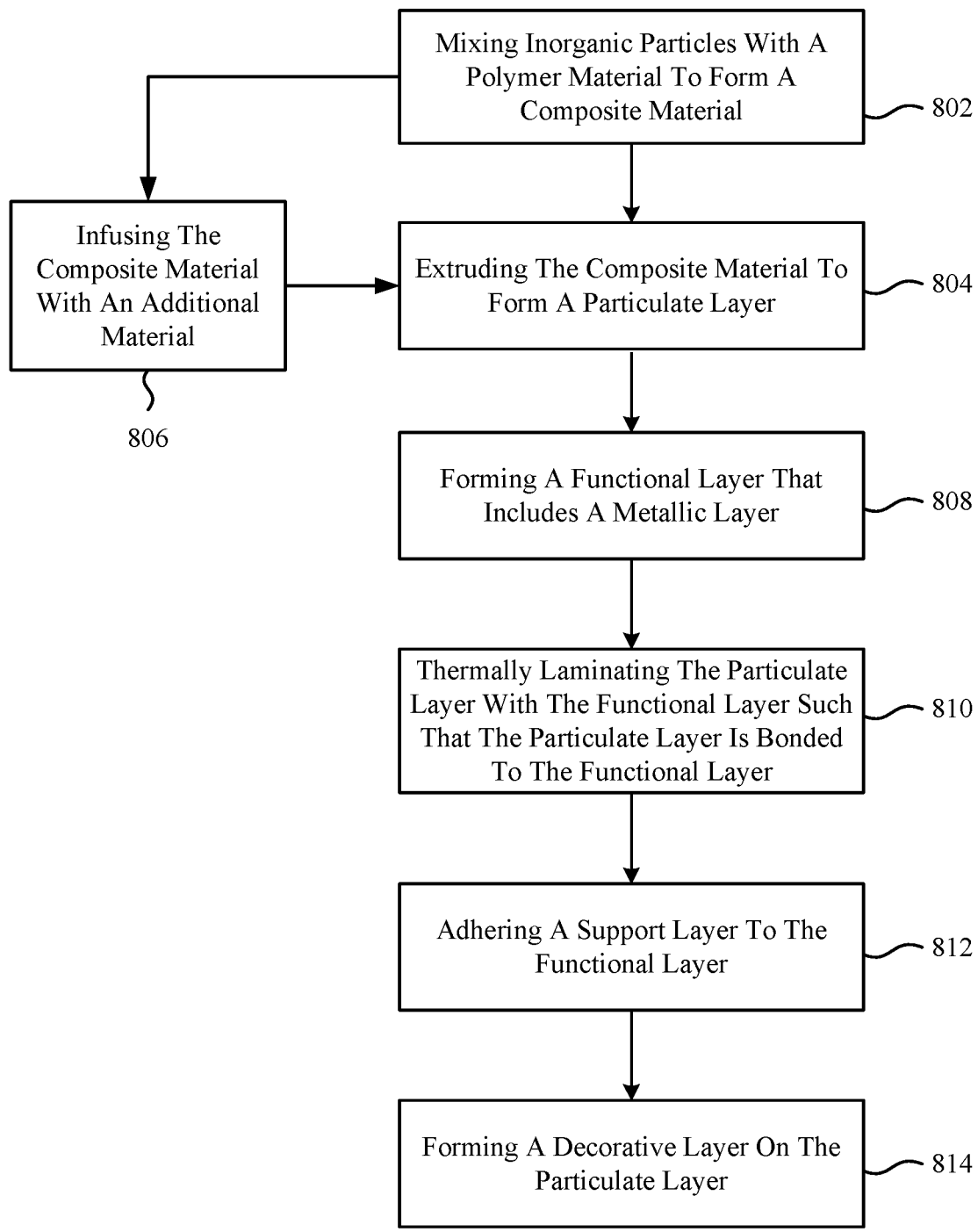
FIG. 8 is a flow chart depicting a method for forming a wallpaper, according to some example embodiments.

FIG. 8 is a flow chart depicting a method 800 for forming a wallpaper, according to some example embodiments. At 802, to prepare a particulate layer, inorganic particles are mixed with a polymer material to form a composite material/masterbatch. The polymer material includes a polymer. In some embodiments, the inorganic particles may be added up to 50% by weight of the composite material. In some embodiments, a light stabilizer may be added to the composite material up to 5% by weight. In one embodiment, the polymer of the polymer material may include or consist of one of LLDPE, LDPE, or HDPE. The inorganic particles may be reflective and transparent at visible and near-mid infrared regions, respectively. For example, the inorganic particles may include one or more of ZnO, $TiO_2$, iron oxide, $Fe_2O_3$, Prussian blue, or silicon, or other particles that can provide color and visual effects to human eyes. In some embodiments, the inorganic particles may include an environmental friendly flame retardant. The inorganic particles may be uniformly or non-uniformly dispersed in the polymer material. A average size of the inorganic particles may be 20-2000 nm.

At 804, the composite material formed at 802 is extruded to form a particulate layer. In some embodiments, before 804 the composite material may be infused with an additional material at 806 to provide more functions to or change the property of the resulting particulate layer. For example, at 806 the composite material may be infused with additional PE pellets to reduce the content of the inorganic particles to 5-20 wt % inclusive in the composite material (and in the resulting particulate layer) and reduce the content of the light stabilizer to 0.5-1 wt % inclusive in the composite material (and in the resulting particulate layer). The particulate layer has a thickness of about 10-100 μm to maintain a low emissivity.

At 808, a functional layer is formed to include a metallic film. The metallic film includes a metallic material that has a low emissivity. For example, the metallic film may include or consist of one or more of aluminum, silver, titanium, polished copper, brass, tin, gold, or a combination of the foregoing metals. A thickness of the metallic film may be less than 10 µm, less than 5 µm, less than 3 µm, less than 1 µm, or between any two of the above numbers. In some embodiments, a polymer layer may be provided to the functional layer to facilitate adhesion with an adhesive layer between the functional layer and a support portion/layer, discussed below. In some embodiments, the polymer layer may include PET. In some embodiments, the polymer layer may include PE PP, PLA, PGA, or PBS, or other biodegradable plastics. In some embodiments, the polymer layer 104b may include flame-resisted PP, PE, PET, PLA, PGA, or PBS. In some embodiments, the polymer layer may be formed on the metallic film by spraying or printing a layer of suitable polymer onto the metallic layer. In some embodiments, the polymer layer may be a pre-prepared thin film and is laminated onto the metallic film. In some embodiments, the polymer layer may be formed on the first surface of the metallic film by depositing a metal thin film on the polymer layer via evaporation techniques. In some embodiments, an optimized thickness of the polymer layer is about 5 µm, 7.5 µm, 10 µm, 12.5 µm, 15 µm, 20 µm, 25 µm, 30 µm, 40 µm, or between any two of the above numbers. In some embodiments, the polymer layer is optional and may be omitted from the functional layer.

At 810, the particulate layer is thermally laminated with the functional layer such that the particulate layer is bonded with the functional layer. For example, the particulate layer and the functional layer are brought together and heated at a temperature (e.g., 310-350° C. or above the meting temperature of the particulate layer) to bond the two layers together.

At 812, a support portion is adhered to the functional layer via an adhesive layer to form a wallpaper.

In some embodiments, at 814 a decorative layer may be formed on the particulate layer to provide visual effects, such as colors and/or textures, to the wallpaper. The decorative layer may have a thickness of less than 5 µm, 4 µm, 3 µm, 2 µm, or 1 µm, or between any two of the above numbers. The decorative layer may be formed by a printing technique, such as flexographic printing, block printing, flatbed screen printing, gravure printing, rotary screen printing, digital printing, etc.

It should be understood that the sequences of the method 800 may be modified and different from those explained above. In some instances, some of the operations 802-814 may be omitted. For example, in some embodiments, operation 814 may be omitted.

Figure 9:
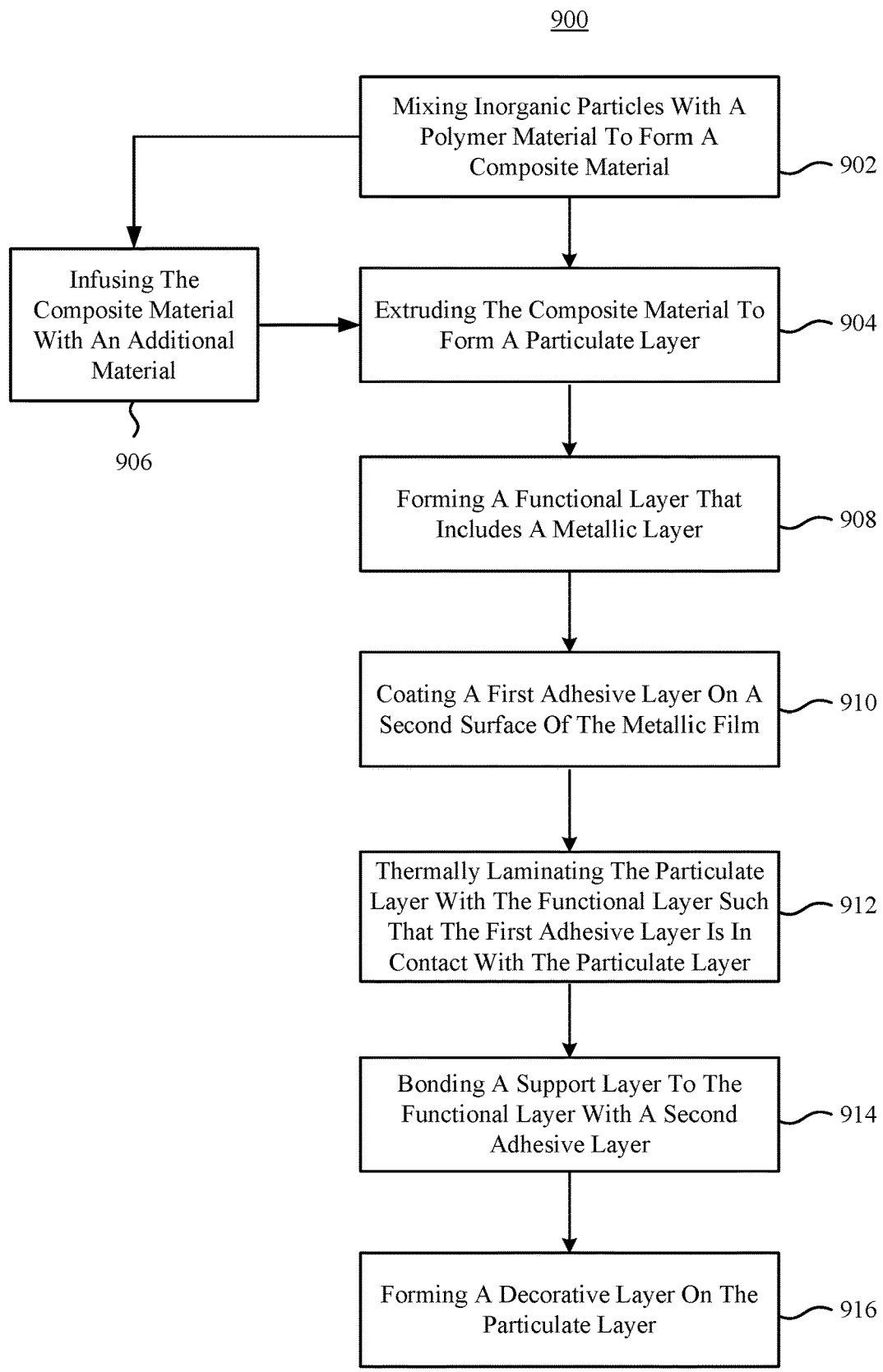
FIG. 9 is a flow chart depicting another method for forming a wallpaper, according to some example embodiments.

FIG. 9 is a flow chart depicting a method 900 for forming a wallpaper, according to some example embodiments. At 902, to prepare a particulate layer, inorganic particles are mixed with a polymer material to form a composite material/masterbatch.

At 904, the composite material is extruded to form a particulate layer. In some embodiments, before 904 the composite material may be infused with an additional material at 906 to provide more functions to or change the property of the resulting particulate layer. For example, at 906 the composite material may be infused with additional PE pellets to reduce the content of the inorganic particles to 5-20 wt % inclusive in the composite material (and in the resulting particulate layer) and reduce the content of the light stabilizer to 0.5-1 wt % inclusive in the composite material (and in the resulting particulate layer). The particulate layer has a thickness of about 10-100 µm to maintain a low emissivity.

At 908, a functional layer is formed to include a metallic film. The metallic film include a metallic material that has a low emissivity. For example, the metallic film may include or consist of one of aluminum, silver, titanium, polished copper, brass, tin, gold, or a combination of the foregoing metals. A thickness of the metallic film may be less than 10 µm, less than 5 µm, less than 3 µm, less than 1 µm, or between any two of the above numbers. In some embodiments, a polymer layer is provided for the functional layer to facilitate adhesion with an adhesive layer between the functional layer and a support layer, discussed below. In some embodiments, the polymer layer may include PET. In some embodiments, the polymer layer may include PE PP, PLA, PGA, or PBS, or other biodegradable plastics. In some embodiments, the polymer layer 104b may include flame-resisted PP, PE, PET, PLA, PGA, or PBS. In some embodiments, the polymer layer may be formed on the metallic film by spraying or printing a layer of suitable polymer onto the metallic layer. In some embodiments, the polymer layer may be a pre-prepared thin film and is laminated onto the metallic film. In some embodiments, the polymer layer may be formed on the first surface of the metallic film by depositing a metal thin film on the polymer layer via evaporation techniques. In some embodiments, an optimized thickness of the polymer layer is about 5 µm, 7.5 µm, 10 µm, 12.5 µm, 15 µm, 20 µm, 25 µm, 30 µm, 40 µm, or between any two of the above numbers. In some embodiments, the polymer layer is optional and may be omitted from the functional layer.

At 910, an adhesive layer is coated on a second surface of the metallic film, where the second surface is opposite to the first surface on which the polymer layer is formed. The adhesive layer includes a polymer that is the same as that of the particulate layer formed at 902-906 to increase the bonding strength between the particulate layer and the functional layer. For example, the adhesive layer may include or consist of a PE material. A thickness of the adhesive layer is less than a thickness of the particulate layer. For example, the thickness of the adhesive layer may be about 3 µm, 5 µm, 6 µm, 8 µm, or 10 µm, or between any two of the above numbers. The adhesive layer may be coated on the second surface of the metallic film by spray coating, printing, spinning coating, slit coating, and other suitable coating techniques. In some embodiments, no glue is used as the adhesive layer in this step.

At 912, the particulate layer is thermally laminated with the functional layer such that the adhesive layer is in contact with the particulate layer. After the adhesive layer is coated on the second surface of the metallic film, the particulate layer and the functional layer are brought together and heated to a temperature (e.g., 310-350° C. or above the meting temperature of the adhesive layer) such that the adhesive layer binds the functional layer to the particulate layer. Because the adhesive layer and the particulate layer contain a same polymer, a strong bonding can be achieved.

At 914, a support portion is adhered to the functional layer with another adhesive layer (e.g., a glue) to form a wallpaper.

In some embodiments, at 916 a decorative layer may be formed on the particulate layer to provide visual effects, such as colors and/or textures, to the wallpaper. The decorative layer may contain inks and be formed by a printing technique, such as flexographic printing, block printing, flatbed screen printing, gravure printing, rotary screen printing, digital printing, etc.

It should be understood that the sequences of the method 900 may be modified and different from those explained above. In some instances, some of the operations 902-916 may be omitted. For example, in some embodiments, operation 916 and/or operation 906 may be omitted.

Figure 10:
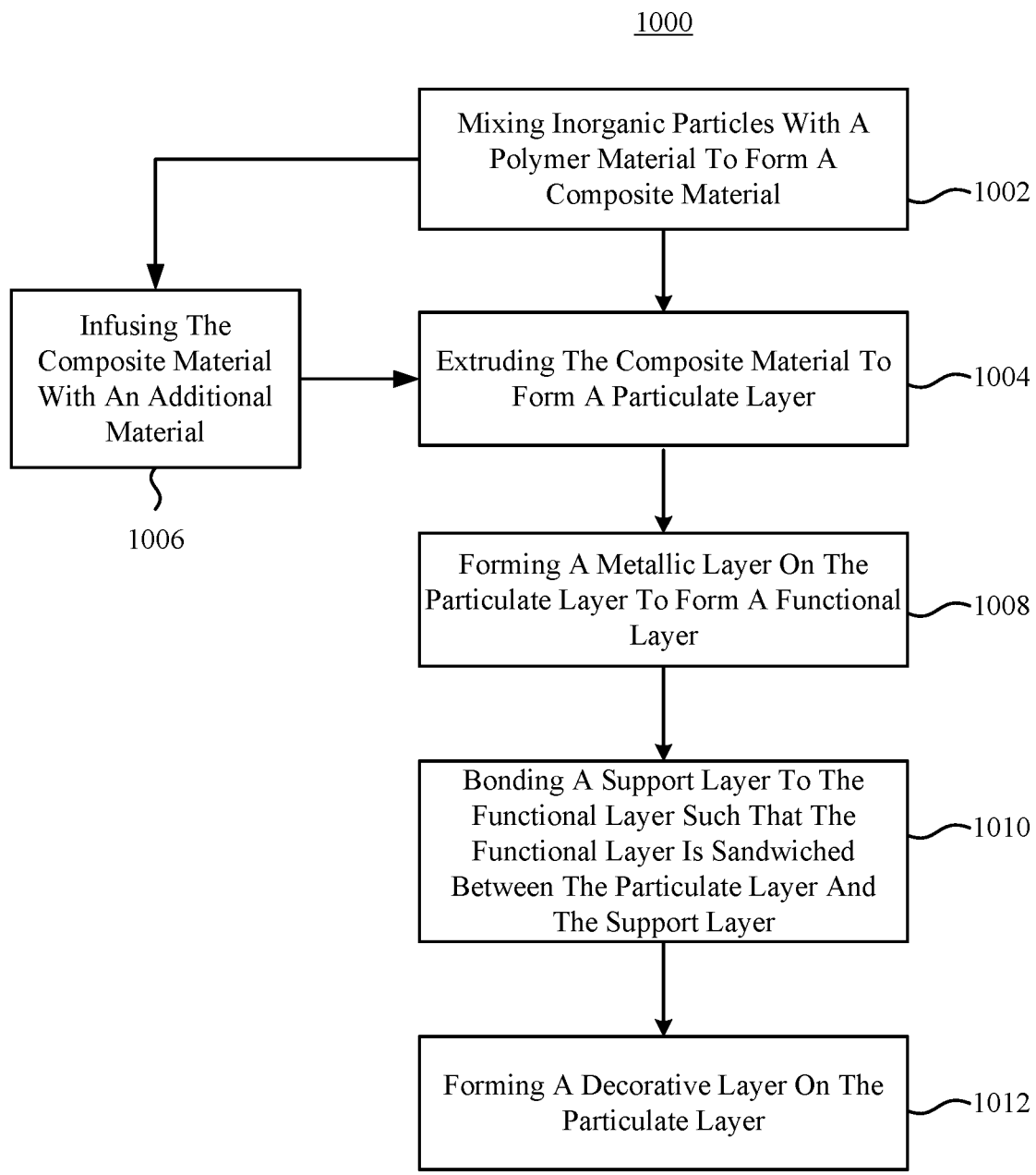
FIG. 10 is a flow chart depicting yet another method for forming a wallpaper, according to some example embodiments.

FIG. 10 is a flow chart depicting a method 1000 for forming a wallpaper, according to some example embodiments. At 1002, to prepare a particulate layer, inorganic particles are mixed with a polymer material to form a composite material/masterbatch.

At 1004, the composite material is extruded to form a particulate layer. In some embodiments, before 1004 the composite material may be infused with an additional material at 1006 to provide more functions to or change the property of the resulting particulate layer. For example, at 1006 the composite material may be infused with additional PE pellets to reduce the content of the inorganic particles to 5-20 wt % inclusive in the composite material (and in the resulting particulate layer) and reduce the content of the light stabilizer to 0.5-1 wt % inclusive in the composite material (and in the resulting particulate layer). The particulate layer has a thickness of about 10-100 µm to maintain a low emissivity.

At 1008, a metallic film is formed on the particulate layer to form a functional layer. The metallic film may be deposited on the particulate layer by a metallization technique. For example, the metallic film may be deposited on the particulate layer by evaporation, electroplating, etc. In some embodiments, the metallization process may be a physical vapor deposition method. The solid metal (e.g. Al) source is first vaporized in a vacuum and deposited on a surface of the particulate layer, where the deposition temperature typically is lower than the melting point of the particulate layer. A typical thickness of metallic film is greater than about 50 nm but no more than 1000 nm.

The metallic film include a metallic material that has a low emissivity. For example, the metallic film may include or consist of one or more of aluminum, silver, titanium, polished copper, brass, tin, gold, or a combination of the foregoing metals.

At 1010, a support portion/layer is adhered to the functional layer such that the functional layer is sandwiched between the particulate layer and the support portion/layer.

In some embodiments, at 1012 a decorative layer may be formed on the particulate layer to provide visual effects, such as colors and/or textures, to the wallpaper. The decorative layer may be formed by a printing technique, such as flexographic printing, block printing, flatbed screen printing, gravure printing, rotary screen printing, digital printing, etc.

It should be understood that the sequences of the method 1000 may be modified and different from those explained above. In some instances, some of the operations 1002-1012 may be omitted. For example, in some embodiments, operation 1012 and/or operation 1006 may be omitted.

In summary, the disclosed wallpapers have a low emissivity and can reflect heat. When used inside a building, the disclosed wallpapers can reflect heat back into the interior of the building during the winter to reduce energy absorbed by the walls of the building. When installed outside a building, the disclosed wallpapers can reflect sunlight illuminated on the building to reduce heat absorbed by the walls of the building, thus lowering the cost used to cool down the building.

The layer structures of the disclosed wallpapers are strong and durable, and can be employed both inside and outside of a building. The disclosed wallpapers reduce energy cost and consumption of the building due to their low emissivity. In some embodiments, the integrity of the wallpapers is improved over conventional wallpapers thanks to using an adhesive between the functional layer and particulate layer that does not include a traditional glue. In the embodiment, the adhesive between the functional layer and particulate layer contains a polymer used in the particulate layer.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A wallpaper comprising,
   a support portion having a flat surface;
   a functional layer disposed on the flat surface of the support portion, the functional layer including a metallic film and having an emissivity of greater than zero and equal to or less than 0.6; and
   a particulate layer disposed on the functional layer and comprising a polymer body and inorganic particles dispersed in the polymer body, wherein the inorganic particles includes one or more of ZnO, $TiO_2$, iron oxide, $Fe_2O_3$, Prussian blue, or silicon.

2. The wallpaper of claim 1, wherein the support portion comprises one of fabric-backed vinyl, paper-backed vinyl, non-woven fabric, wood, metal, stucco, clad, brick, masonry, stone, steel, cement, or concrete.

3. The wallpaper of claim 1, further comprising a first adhesive layer disposed between the support portion and the functional layer.

4. The wallpaper of claim 3, wherein the functional layer further includes a polymer layer in contact with the first adhesive layer.

5. The wallpaper of claim 4, wherein the polymer layer comprises one or more of polyethylene terephthalate, polyethylene, polypropylene, polylactide, poly(glycolic acid), or polybutylene succinate.

6. The wallpaper of claim 1, wherein the metallic film comprises one of aluminum, silver, titanium, polished copper, brass, tin, gold, or a combination of the foregoing metals.

7. The wallpaper of claim 3, further comprising a second adhesive layer disposed between the functional layer and the particulate layer, wherein the second adhesive layer and the polymer body includes polyethylene.

8. The wallpaper of claim 7, wherein a thickness of the second adhesive layer is less than a thickness of the particulate layer.

9. The wallpaper of claim 1, wherein the particulate layer further comprises a UV stabilizer.

10. The wallpaper of claim 1, wherein the inorganic particles include nanoparticles or submicron particles.

11. The wallpaper of claim 1, further comprising a decorative layer disposed on the particulate layer.

12. A wallpaper comprising,
a support portion having a flat surface;
a functional layer disposed on the flat surface of the support portion, the functional layer including a metallic film and having an emissivity of greater than zero and equal to or less than 0.6;
a particulate layer disposed on the functional layer and comprising a polymer body and inorganic particles dispersed in the polymer body;
a first adhesive layer disposed between the support portion and the functional layer; and
a second adhesive layer disposed between the functional layer and the particulate layer, wherein the second adhesive layer and the polymer body includes polyethylene.

13. The wallpaper of claim 12, wherein the support portion comprises one of fabric-backed vinyl, paper-backed vinyl, non-woven fabric, wood, metal, stucco, clad, brick, masonry, stone, steel, cement, or concrete.

14. The wallpaper of claim 12, further comprising a first adhesive layer disposed between the support portion and the functional layer.

15. The wallpaper of claim 14, wherein the functional layer further includes a polymer layer in contact with the first adhesive layer.

16. The wallpaper of claim 15, wherein the polymer layer comprises one or more of polyethylene terephthalate, polyethylene, polypropylene, polylactide, poly(glycolic acid), or polybutylene succinate.

17. The wallpaper of claim 12, wherein a thickness of the second adhesive layer is less than a thickness of the particulate layer.

18. A wallpaper comprising,
a support portion having a flat surface;
a functional layer disposed on the flat surface of the support portion, the functional layer including a metallic film and having an emissivity of greater than zero and equal to or less than 0.6; and
a particulate layer disposed on the functional layer and comprising a polymer body and inorganic particles dispersed in the polymer body, wherein the particulate layer further comprises a UV stabilizer.

19. The wallpaper of claim 18, wherein the support portion comprises one of fabric-backed vinyl, paper-backed vinyl, non-woven fabric, wood, metal, stucco, clad, brick, masonry, stone, steel, cement, or concrete.

20. The wallpaper of claim 18, further comprising an adhesive layer disposed between the support portion and the functional layer.

\* \* \* \* \*